United States Patent
Kosugi

(10) Patent No.: US 11,661,901 B2
(45) Date of Patent: *May 30, 2023

(54) HOUSING DEVICE AND SYSTEM

(71) Applicant: KABUSHIKI KAISHA TOKAI RIKA DENKI SEISAKUSHO, Aichi (JP)

(72) Inventor: Masanori Kosugi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 26 days.

This patent is subject to a terminal disclaimer.

(21) Appl. No.: 17/231,503

(22) Filed: Apr. 15, 2021

(65) Prior Publication Data

US 2021/0381462 A1 Dec. 9, 2021

(30) Foreign Application Priority Data

Jun. 3, 2020 (JP) .............................. JP2020-096915

(51) Int. Cl.
*F02D 41/26* (2006.01)
*G08C 17/02* (2006.01)

(52) U.S. Cl.
CPC ............ *F02D 41/26* (2013.01); *G08C 17/02* (2013.01); *G08C 2201/70* (2013.01)

(58) Field of Classification Search
CPC ....... B60R 25/24; B60R 25/01; B60R 25/245; G07C 9/00309; G07C 9/00944; G07C 2009/00769; G07C 2009/00793; G07C 2009/0096; G08C 17/02; G08C 2201/70; H04W 4/48; F02D 41/26
See application file for complete search history.

(56) References Cited

U.S. PATENT DOCUMENTS

| | | | | |
|---|---|---|---|---|
| 7,034,658 B2* | 4/2006 | Hayashi | .................. | B60R 25/04 340/5.72 |
| 8,487,743 B2* | 7/2013 | Proefke | .................. | B60R 25/24 70/389 |
| 9,355,512 B2* | 5/2016 | Jurisch | ............... | G07C 9/00706 |
| 10,223,849 B2* | 3/2019 | Jain | ........................... | G07C 9/28 |
| 10,625,713 B2* | 4/2020 | Suzuki | .................. | H04W 24/04 |

(Continued)

FOREIGN PATENT DOCUMENTS

EP   3 418 985   12/2018

*Primary Examiner* — Adnan Aziz
(74) *Attorney, Agent, or Firm* — Greenblum & Bernstein, P.L.C.

(57) ABSTRACT

To provide a mechanism that can further improve security of an electronic key installed in a vehicle interior.

There is provided a housing device configured to store an electronic key configured to perform wireless communication with an in-vehicle device mounted on a vehicle, the housing device comprising: a housing formed by using a material that shields a first signal transmitted by the in-vehicle device; a trigger signal reception antenna configured to receive a trigger signal transmitted by a portable device carried by a user; and a control mechanism configured to control whether or not to enable the first signal to reach an inside of the housing based on the trigger signal, wherein the second signal transmitted by the electronic key that has received the first signal is used to control a control target device installed in the vehicle.

10 Claims, 6 Drawing Sheets

(56) References Cited

U.S. PATENT DOCUMENTS

| | | | | |
|---|---|---|---|---|
| 11,260,826 | B2* | 3/2022 | Kosugi | G07C 9/00944 |
| 2006/0139146 | A1* | 6/2006 | Ito | B60R 25/248 |
| | | | | 340/5.31 |
| 2008/0024270 | A1* | 1/2008 | Katagiri | B60R 25/04 |
| | | | | 340/5.72 |
| 2009/0309696 | A1* | 12/2009 | Tsuruta | B60R 25/04 |
| | | | | 340/5.22 |
| 2015/0314434 | A1* | 11/2015 | Bevins, Jr. | H02G 1/02 |
| | | | | 408/124 |
| 2017/0190318 | A1* | 7/2017 | Imamura | B60R 25/241 |
| 2018/0118163 | A1* | 5/2018 | Murakami | B60R 25/01 |
| 2018/0191077 | A1* | 7/2018 | Lee | H01Q 1/521 |
| 2018/0370487 | A1* | 12/2018 | Ishikawa | G08C 17/02 |
| 2019/0118769 | A1* | 4/2019 | Tamane | B60R 25/24 |
| 2020/0114875 | A1* | 4/2020 | Stitt | H01Q 25/00 |
| 2020/0282951 | A1* | 9/2020 | Elangovan | B60R 25/241 |
| 2020/0372737 | A1* | 11/2020 | Jonsson | G08C 17/02 |
| 2021/0016743 | A1* | 1/2021 | Kusumoto | E05B 81/78 |
| 2021/0237689 | A1* | 8/2021 | Koizumi | B60R 25/245 |
| 2021/0306083 | A1* | 9/2021 | Sanji | E05B 49/00 |
| 2022/0058899 | A1* | 2/2022 | Iida | G07C 9/00309 |
| 2022/0180679 | A1* | 6/2022 | Wisnia | G07C 9/00174 |

* cited by examiner

HOUSING DEVICE AND SYSTEM

CROSS REFERENCE TO RELATED APPLICATION(S)

This application is based upon and claims benefit of priority from Japanese Patent Application No. 2020-096915, filed on Jun. 3, 2020, the entire contents of which are incorporated herein by reference.

BACKGROUND

The present invention relates to a housing device and a system.

In recent years, technologies that control a device based on a result of wireless communication have been developed. As an example of a system that uses the above technologies, there is a system that locks or unlocks a door device installed in a vehicle based on a result of wireless communication between an electronic key and an in-vehicle device that is mounted on the vehicle. Further, there has been also a proposal for effectively using the above-described electronic key. For example, EP 3418985 discloses a technology where a housing that stores an electronic key is installed in a vehicle interior, and a user remotely operates the electronic key by using a device carried by the user and thereby unlocks a door of the vehicle.

SUMMARY

In this regard, in a case where the electronic key is installed in the vehicle interior and used similar to the technology disclosed in EP 3418985, an important task is to secure security.

Accordingly, the present invention is made in light of the above problem, and an object of the present invention is to provide a mechanism that can further improve security of an electronic key installed in a vehicle interior.

To solve the above described problem, according to an aspect of the present invention, there is provided a housing device configured to store an electronic key configured to perform wireless communication with an in-vehicle device mounted on a vehicle, the housing device comprising: a housing formed by using a material that shields a first signal transmitted by the in-vehicle device; a trigger signal reception antenna configured to receive a trigger signal transmitted by a portable device carried by a user; and a control mechanism configured to control whether or not to enable the first signal to reach an inside of the housing based on the trigger signal, wherein the second signal transmitted by the electronic key that has received the first signal is used to control a control target device installed in the vehicle.

To solve the above described problem, according to another aspect of the present invention, there is provided a system comprising: an electronic key configured to perform wireless communication with an in-vehicle device mounted on a vehicle; a housing device configured to store the electronic key; and a portable device carried by a user, wherein the housing device includes a housing formed by using a material that shields a first signal transmitted by the in-vehicle device, a trigger signal reception antenna configured to receive a trigger signal transmitted by the portable device, and a control mechanism configured to control whether or not to enable the first signal to reach an inside of the housing based on the trigger signal, and the second signal transmitted by the electronic key that has received the first signal is used to control a control target device installed in the vehicle.

To solve the above described problem, according to another aspect of the present invention, there is provided a system comprising: an in-vehicle device mounted on a vehicle; an electronic key configured to perform wireless communication with the in-vehicle device; and a housing device configured to store the electronic key, wherein the housing device includes a housing formed by using a material that shields a first signal transmitted by the in-vehicle device, a trigger signal reception antenna configured to receive a trigger signal transmitted by a portable device carried by a user, and a control mechanism configured to control whether or not to enable the first signal to reach an inside of the housing based on the trigger signal, and the second signal transmitted by the electronic key that has received the first signal is used to control a control target device installed in the vehicle.

As described above, according to the present invention, it is possible to further improve security of an electronic key installed in a vehicle interior.

DETAILED DESCRIPTION OF THE EMBODIMENT

Figure 1:
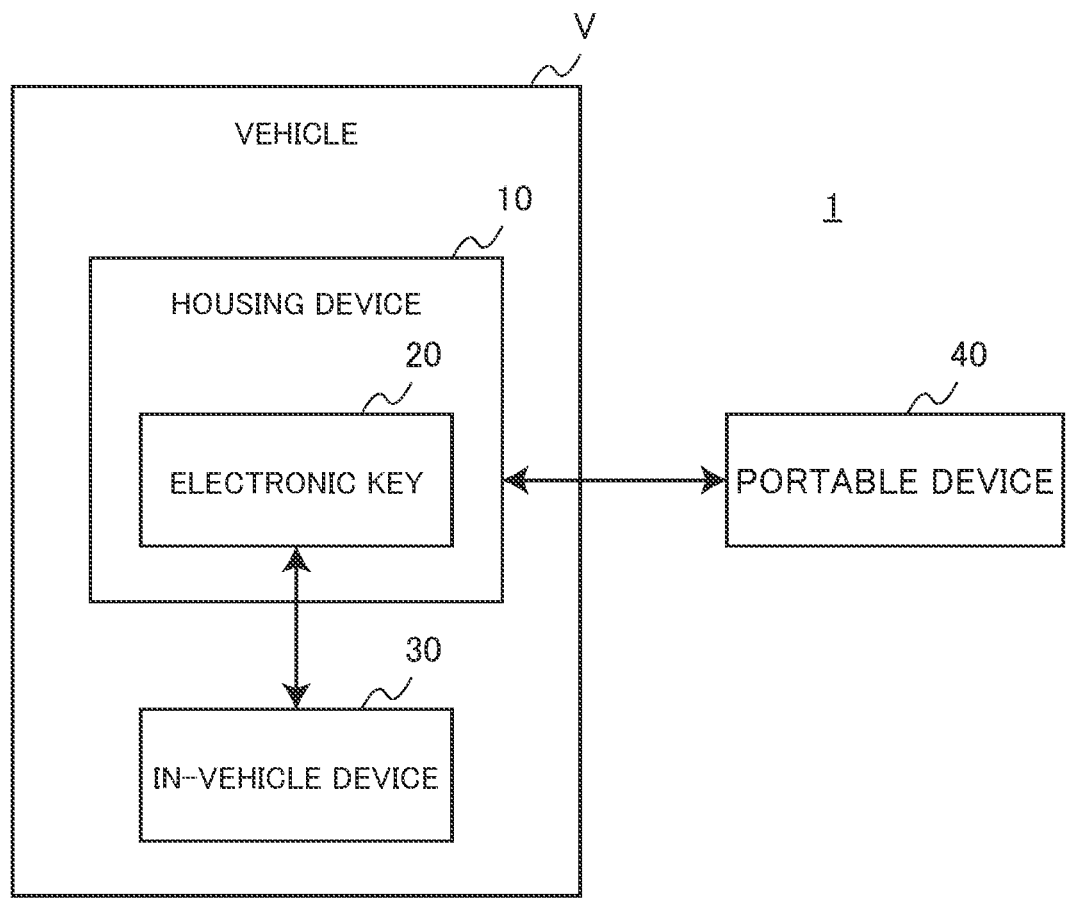
FIG. 1 is a block diagram illustrating a configuration example of a system 1 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Embodiment>

«1.1. System Configuration Example»

First, a configuration example of a system 1 according to an embodiment of the present invention will be described. FIG. 1 is a block diagram illustrating the configuration example of the system 1 according to the embodiment of the present invention. As illustrated in FIG. 1, the system 1 according to the present embodiment includes a housing device 10 installed in a vehicle interior of a vehicle V, an electronic key 20 stored in the housing device 10, an in-vehicle device 30 mounted on the vehicle V, and a portable device 40 carried by a user.

(Housing Device 10)

The housing device 10 according to the present embodiment is a device that is mounted on the vehicle V, and stores the electronic key that performs wireless communication with the in-vehicle device 30 mounted on the identical vehicle V. A detailed configuration example of the housing device 10 according to the present embodiment will be separately described.

(Electronic Key 20)

The electronic key 20 according to the present embodiment is a device that is provided together with the vehicle V to the user. The user can lock or unlock a door device installed in the vehicle V and start an engine by using the electronic key 20 without using a cylinder key.

(In-Vehicle Device 30)

The in-vehicle device 30 according to the present embodiment is a device that performs wireless communication with the electronic key 20, and authenticates the electronic key 20 based on a result of the wireless communication. Further, the in-vehicle device 30 controls a control target device installed in the vehicle V based on a result of the above authentication. Note that an example of the control target device according to the present embodiment is the door device and the engine.

(Portable Device 40)

The portable device 40 according to the present embodiment is carried by the user, and is configured to remotely operate the electronic key 20 through wireless communication with the housing device 10. The portable device 40 according to the present embodiment may be, for example, an information processing device such as a smartphone, a tablet, or a wearable device.

The configuration example of the system 1 according to the present embodiment has been described above. Note that the above configuration described with reference to FIG. 1 is just an example, and the configuration of the system 1 according to the present embodiment is not limited this example. The configuration of the system 1 according to the present embodiment is flexibly modifiable according to a specification or an operation.

Hereinafter, a general use example where the in-vehicle device 30 authenticates the electronic key 20 will be cited and described. In the general use example, the electronic key 20 is carried by the user.

Further, the in-vehicle device 30 may authenticate the electronic key 20 based on, for example, a result of wireless communication that uses a first signal and a second signal.

For example, when detecting that the user has touched a door knob on an exterior of the door device installed in the vehicle V, the in-vehicle device 30 may transmit the first signal.

In this case, the electronic key 20 carried by the user receives the above first signal, and transmits the second signal as a response to the first signal.

The in-vehicle device 30 receives the above second signal, and authenticates the electronic key 20 based on, for example, identification information included in the second signal.

In this regard, when verifying authenticity of the electronic key 20, the in-vehicle device 30 performs control to unlock the door device (an example of the control target device according to the present embodiment) installed in the vehicle V.

Further, when, for example, detecting that brakes have been applied upon starting of the engine, the in-vehicle device 30 may transmit the first signal.

In this regard, when verifying the authenticity of the electronic key 20 based on the second signal transmitted by the electronic key 20 as the response to the above first signal, the in-vehicle device 30 may permit the engine (an example of the control target device according to the present embodiment) to start.

According to the above-described control, it is possible to access a vehicle interior and start the engine without operating a conventionally used cylinder key, so that it is possible to improve user friendliness.

On the other hand, a case will be assumed where the electronic key 20 is stored in the housing device 10 and is installed in the vehicle interior as in the present embodiment. In this case, the user remotely operates the electronic key 20 stored in the housing device 10 by using the portable device 40 from an outside of the vehicle V.

More specifically, the portable device 40 transmits a trigger signal based on a user's operation.

Further, the housing device 10 that has received the trigger signal causes an internally disposed actuator 130 to move to operate an operation section 210 installed in the electronic key 20.

The electronic key 20 transmits the second signal based on a fact that the operation section 210 has been operated.

When verifying the authenticity of the electronic key 20 based on the received second signal, the in-vehicle device 30 performs control to unlock the door device installed in the vehicle V.

According to the above-described control, it is possible to access the vehicle V while leaving the electronic key 20 installed in the vehicle interior of the vehicle V. Consequently, by distributing, for example, authentication information for enabling wireless communication with the housing device 10 to the portable device 40 in advance, it is possible to share the vehicle V and the electronic key 20 between a plurality of users.

However, for example, a case will be assumed where a third party without a valid use right of the vehicle V intrudes the vehicle interior of the vehicle V by an unrightful action of, for example, breaking a door.

In this regard, if the electronic key 20 stored in the housing device 10 can receive the first signal transmitted by the in-vehicle device 30, the electronic key 20 transmits the second signal as a response to the first signal, and the in-vehicle device 30 authenticates the electronic key 20. That is, the third party can unrightfully start the engine and unrightfully use the vehicle V as a result in some cases.

A technical idea of the present invention is made focusing upon the above point, and makes it possible to further improve security of the electronic key 20 installed in the vehicle interior. To realize this improvement, the housing device 10 according to the embodiment of the present invention includes a housing 110 that is formed by using a material that shields the first signal transmitted by the in-vehicle device 30, a trigger signal reception antenna 120 that receives the trigger signal transmitted by the portable device 40 carried by the user, and a control mechanism 140 that controls whether or not to enable the first signal to reach an inside of the housing 110 based on the trigger signal. Further, one of features is that the second signal transmitted by the electronic key 20 that has received the above first signal is used to control the control target device installed in the vehicle V.

That is, in the housing device 10 according to the present embodiment, when operating based on the trigger signal transmitted by the portable device 40, the control mechanism 140 can switch whether or not to enable the first signal to reach the inside of the housing 110, and switch whether or not to enable the electronic key 20 stored inside the housing 110 to receive the first signal as a result.

Accordingly, when a third party unrightfully intrudes the vehicle interior of the vehicle V, since the control mechanism 140 is in such a state that the control mechanism 140 does not allow the first signal to reach the inside of the housing 110 as described below, the electronic key 20 cannot receive the first signal and therefore does not transmit the second signal, so that it is possible to prevent the in-vehicle device 30 from authenticating the electronic key 20.

On the other hand, the legitimate user with the valid use right of the vehicle V can cause the actuator 130 to move and remotely operate the electronic key 20 by causing the portable device 40 to transmit the trigger signal. Accordingly, it is possible to unlock the door device installed in the vehicle V, and access the vehicle interior.

Further, the above user can realize a state where the control mechanism 140 allows the first signal to reach the inside of the housing 110 by causing the portable device 40 to transmit the trigger signal. Accordingly, it is possible to cause the in-vehicle device 30 to authenticate the electronic key 20, and start the engine and move the vehicle V without operating the housing device 10 and the electronic key 20 after an access to the vehicle interior is made.

The configuration example of the housing device 10 according to the present embodiment having the above features will be described in detail below.

«1.2. Configuration Example of Housing Device 10»

Figure 2:
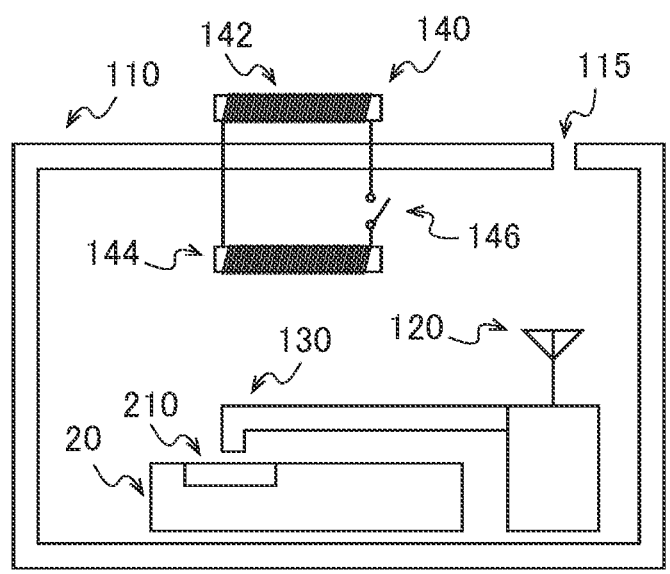
FIG. 2 is a diagram schematically illustrating a configuration example of a housing device 10 and a configuration example of an electronic key 20 stored inside the housing device 10 according to the embodiment.

FIG. 2 is a diagram schematically illustrating the configuration example of the housing device 10 and a configuration example of the electronic key 20 stored inside the housing device 10 according to the present embodiment. As described above, the housing device 10 according to the present embodiment includes the housing 110, the trigger signal reception antenna 120, the actuator 130, and the control mechanism 140. Further, the electronic key 20 includes at least the operation section 210.

(Housing 110)

The housing 110 according to the present embodiment is formed by using the material that shields the first signal of the first frequency band. The first frequency band according to the present embodiment is, for example, a Low Frequency (LF) range.

More specifically, the housing 110 according to the present embodiment may be formed by using a highly magnetic permeable material having a predetermined magnetic permeability or more to shield the first signal of the first frequency band and the second signal of the second frequency band whose wavelength is shorter than the wavelength of the first signal.

The second frequency band according to the present embodiment is, for example, an Ultra High Frequency (UHF) range.

An example of the highly magnetic permeable material according to the present embodiment is iron. When, for example, iron is used as the material, the housing 110 may be formed by being covered with an iron plate of appropriately 0.5 mm to 5 mm. Further, in this case, it is difficult to cover a part related to opening and closing of the housing 110 seamlessly with the iron plate. Therefore, the part may be formed such that the iron plate overlaps appropriately 10 mm, or may adopt a structure that enables electric conduction.

On the other hand, the highly magnetic permeable material according to the present embodiment is not limited to iron, and may adopt, for example, silicon steel. Note that, instead of the highly magnetic permeable material, a conductor (e.g., aluminum or copper) that produces an eddy current can shield the first signal of the first frequency band and the second signal of the second frequency band. In this regard, when a material of a low magnetic permeability such as aluminum is used, a gap of the part related to opening and closing of the housing 110 needs to adopt a structure that enables electric conduction, and be provided such that the eddy current produced in the first frequency band in particular does not become intermittent.

The electronic key 20 stored in the housing 110 formed as described cannot receive the first signal, so that it is possible to prevent the above-described third party from unrightfully starting the engine.

On the other hand, it is demanded for use of the legitimate user that the second signal transmitted by the electronic key 20 reaches the outside of the housing 110.

To meet this demand, the housing 110 according to the present embodiment is provided with the passage structure 115 that allows the second signal transmitted by the electronic key 20 to pass outside.

The passage structure 115 according to the present embodiment may be a slit that is formed in a size and a shape that do not allow the first signal to pass through and allow the second signal to pass through.

More specifically, the length in a longitudinal direction of the slit-shaped passage structure 115 according to the present embodiment may be determined based on the wavelength of the first signal and the wavelength of the second signal.

Figure 3:
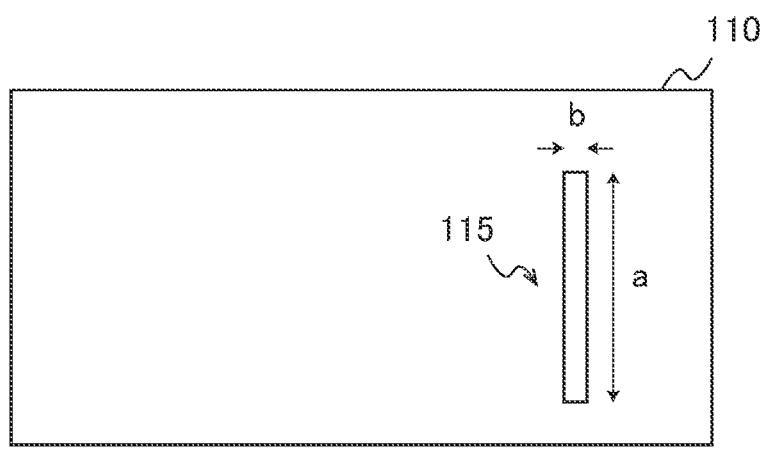
FIG. 3 is a diagram for describing a slit-shaped passage structure 115 provided to a housing 110 according to the embodiment.

FIG. 3 is a diagram for describing the slit-shaped passage structure 115 provided to the housing 110 according to the present embodiment.

In this regard, in a case where there is a rectangular hole (slit) in a metal plate whose thickness d is 0 (or the thickness d can be regarded as 0. d<$\lambda$), a signal shield effect SE of the slit is expressed by a following equation (1).

In this regard, as illustrated in FIG. 3, a condition is that the length in the longitudinal direction of the slit-shaped passage structure 115 is a, the length in a lateral direction of the slit-shaped passage structure 115 is b, the length a in the longitudinal direction is sufficiently longer than the length b in the lateral direction (b<<a), and the length a in the longitudinal direction is shorter than the wavelength $\lambda$ of the signal (a<$\lambda$).

$$SE = 20 \log(\lambda/2a) \text{ [dB]} \tag{1}$$

According to the above equation (1), when the length a in the longitudinal direction is $\lambda/2$, the signal does not attenuate at all, and passes through the slit-shaped passage structure 115. Hence, when, for example, the frequency of the second signal is approximately 300 MHz, that is, when the wavelength $\lambda$ of the second signal is approximately 1 m, and when the length a in the longitudinal direction of the slit-shaped passage structure 115 is 50 cm, the shield effect SE=0 dB holds, so that it is possible to allow the second signal to completely pass.

On the other hand, when the frequency of the first signal is approximately 300 KHz, that is, when the wavelength $\lambda$ of the first signal is approximately 1 km, and when the length a in the longitudinal direction of the slit-shaped passage structure 115 is 50 cm, the shield effect SE=60 dB holds, so that it is possible to effectively shield the first signal.

As described above, the length in the longitudinal direction of the slit-shaped passage structure 115 according to the present embodiment is determined based on the wavelength of the first signal and the wavelength of the second signal. The shield effect SE=0 dB does not actually need to hold, and, from a viewpoint of, for example, miniaturization of the housing device 10, the length in the longitudinal direction of the slit-shaped passage structure 115 according to the present embodiment may be formed to be, for example, approximately 100 to 150 mm. Note that the length in the lateral direction of the slit-shaped passage structure 115 may be formed to be, for example, approximately 3 mm in this case.

Note that, when a material that is not a highly magnetic permeable material such as afore-mentioned aluminum is used for the housing 110, a radio wave of the first frequency band leaks to the inside of the housing 110 near the slit-shaped passage structure 115. Therefore, it is desired that the electronic key 20 is disposed apart from the slit-shaped passage structure 115 inside the housing 110.

Further, the number of the slit-shaped passage structures 115 according to the present embodiment is not limited to one. The plurality of slit-shaped passage structures 115 according to the present embodiment may be provided.

By adjusting the size, the shape, and the number of the slit-shaped passage structures 115 according to the present embodiment, it is possible to adjust shielding performance with respect to the first signal and communication performance with respect to the second signal.

Description will continue with reference to FIG. 2 again.

(Trigger Signal Reception Antenna 120)

The trigger signal reception antenna 120 according to the present embodiment receives the trigger signal transmitted by the portable device 40.

The trigger signal reception antenna 120 according to the present embodiment may be disposed inside the housing 110 as illustrated in, for example, FIG. 2. In this case, the trigger signal needs to pass through the slit-shaped passage structure 115, and reach the inside of the housing 110. Therefore, a signal having a wavelength equal to or more than the wavelength of the second signal is used as the trigger signal. For example, a Bluetooth (registered trademark) signal may be adopted as the trigger signal.

On the other hand, the trigger signal reception antenna 120 according to the present embodiment may be disposed outside the housing 110. In this case, the trigger signal does not need to pass through the slit-shaped passage structure 115, and therefore a signal of an arbitrary wavelength is used. In this case, the trigger signal may be a Bluetooth signal, or may be a signal of a frequency band used for Near Field Communication (NFC).

(Actuator 130)

The actuator 130 according to the present embodiment moves based on the trigger signal received by the trigger signal reception antenna 120, and operates the operation section 210 installed in the electronic key 20.

Hence, the actuator 130 is formed and disposed according to shapes and specifications of the electronic key 20 and the operation section 210.

In a case where, for example, the electronic key 20 transmits the second signal when the operation section 210 that is a button switch is pushed, the actuator is formed and disposed so as to be able to push the operation section 210.

Further, in a case where, for example, the electronic key 20 transmits the second signal when the operation section 210 that is a slide switch is slid, the actuator is formed and disposed so as to be able to slide the operation section 210.

(Control Mechanism 140)

The control mechanism 140 according to the present embodiment controls whether or not to enable the first signal to reach the inside of the housing 110 based on the trigger signal received by the trigger signal reception antenna 120.

For example, the control mechanism 140 according to the present embodiment may control whether or not to re-emit the first signal received outside the housing 110 to the inside of the housing 110 based on the trigger signal received by the trigger signal reception antenna 120.

Hence, the control mechanism 140 according to the present embodiment may include a reception antenna 142 that is disposed outside the housing 110, a re-emission antenna 144 that is disposed inside the housing 110, and a switch that switches whether or not to connect the reception antenna 142 and the re-emission antenna 144.

The reception antenna 142 and the re-emission antenna 144 included in the control mechanism 140 are antennas that resonate with the first signal of the first frequency band.

The reception antenna 142 may be disposed at a posture (a direction and an angle) at which the reception antenna 142 can receive the first signal according to a direction of the first signal transmitted in the vehicle interior of the vehicle V. Further, the reception antenna 142 may be formed such that the user can adjust the posture as appropriate. Further, the three reception antennas 142 may be disposed so as to face, for example, directions of three different axes.

The control mechanism 140 according to the present embodiment switches the switch 146 based on the trigger signal received by the trigger signal reception antenna 120.

According to the above control, it is possible to control whether or not the first signal received outside the housing 110 by the reception antenna 142 is re-emitted by the re-emission antenna disposed inside the housing 110.

Note that the above-described configuration of the control mechanism 140 is just an example, and the configuration of the control mechanism 140 according to the present embodiment is not limited to this example.

The control mechanism 140 according to the present embodiment may control, for example, the slit-shaped passage structure 115 or a size (in the longitudinal direction in particular) of the slit-shaped passage structure 115. In this case, by changing the size of the slit-shaped passage structure 115 based on the trigger signal, the control mechanism 140 can switch whether or not to enable the first signal to pass through the slit-shaped passage structure 115.

Further, the passage structure 115 according to the present embodiment may not be necessarily formed in the slit shape.

Figure 4:
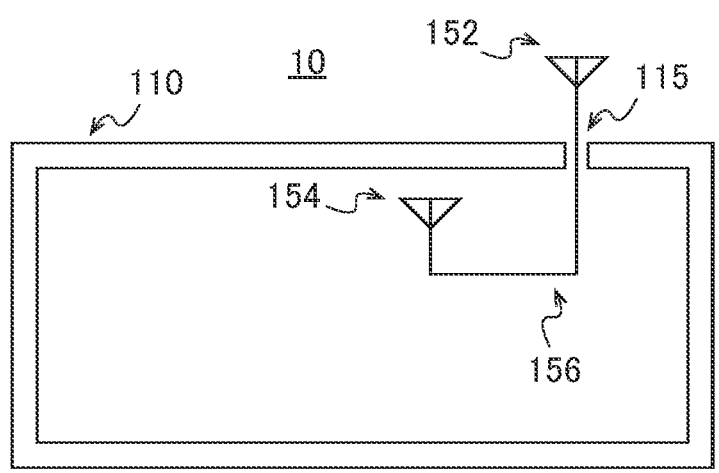
FIG. 4 is a diagram for describing a hole-shaped passage structure 115 provided to the housing 110 according to the embodiment.

FIG. 4 is a diagram for describing another example of the passage structure 115 according to the present embodiment. In the example illustrated in FIG. 4, the passage structure 115 according to the present embodiment is formed in, for example, a hole shape whose diameter is approximately 5 to 10 mm. Note that part of the configuration illustrated in FIG. 2 is omitted in FIG. 4.

In this case, the first signal of the first frequency band can hardly pass through the hole-shaped passage structure 115 irrespectively of a magnetic permeability of a material used for the housing 110.

On the other hand, in this case, the second signal of the second frequency band also has difficulty in passing through the hole-shaped passage structure 115.

To solve the above difficulty, the housing device 10 according to the present embodiment may further include a transmission/reception antenna 152 that is disposed outside the housing 110, a transmission/reception antenna 154 that is disposed inside the housing 110, and a cable 156 that passes through the hole-shaped passage structure 115 and connects the transmission/reception antenna 152 and the transmission/reception antenna 154.

In this regard, the transmission/reception antenna 152 and the transmission/reception antenna 154 are antennas that can transmit and receive the second signal of the second frequency band.

Further, the cable 156 is a cable (e.g., coaxial cable) that can convey the second signal of the second frequency band.

According to the above-described configuration, the second signal transmitted by the electronic key 20 is received by the transmission/reception antenna 154, is conveyed through the cable 156, and then is transmitted by the transmission/reception antenna 152 from the outside of the housing 110.

Further, according to the above-described configuration, it is possible to allow the second signal transmitted by the electronic key 20 to pass to the outside of the housing 110 while shielding the first signal of the first frequency band.

Note that, when the signal of the second frequency band is adopted for the trigger signal, the trigger signal can reach the inside of the housing 110 through, for example, the hole-shaped passage structure 115 similar to the second signal.

On the other hand, the housing device 10 according to the present embodiment may additionally include a dedicated passage structure that allows the trigger signal to pass through, a transmission/reception antenna, and a cable. The passage structure, the transmission/reception antenna, and the cable according to the present embodiment can be designed as appropriate according to a property of a signal to be used.

Further, the control mechanism 140 according to the present embodiment may control, for example, opening and closing of a different hole from the passage structure 115. In this case, by switching opening and closing of the hole formed in a size that the first signal can pass through based on the trigger signal, the control mechanism 140 can switch whether or not to enable the first signal to reach the inside of the housing 110.

The configuration example of the housing device 10 according to the present embodiment has been described above. Note that the case where the first signal transmitted by the in-vehicle device 30 and the second signal transmitted by the electronic key 20 are signals of respectively different frequency bands has been described above as a main example.

On the other hand, the first signal and the second signal according to the present embodiment may be signals of an identical frequency band. Even in this case, by switching whether or not to enable the second signal transmitted by the electronic key 20 to reach the outside of the housing 110, the control mechanism 140 can control whether or not to enable the in-vehicle device 30 to authenticate the electronic key 20.

Note that a method of switching whether or not to enable the second signal transmitted by the electronic key 20 to reach the outside of the housing 110 includes the above-described signal re-remission control and hole opening/closing control. Further, the passage structure 115 may not be formed in this case.

«1.3 Flow of Process»

Next, a flow of a process of the system 1 according to the present embodiment will be described in detail. Note that an example of a case where the control mechanism 140 controls whether or not to re-emit the first signal received outside the housing 110 to the inside of the housing 110 will be described below.

First, a flow in a case where control is performed to unlock the door installed in the vehicle V and start the engine will be described with reference to FIG. 5.

Figure 5:
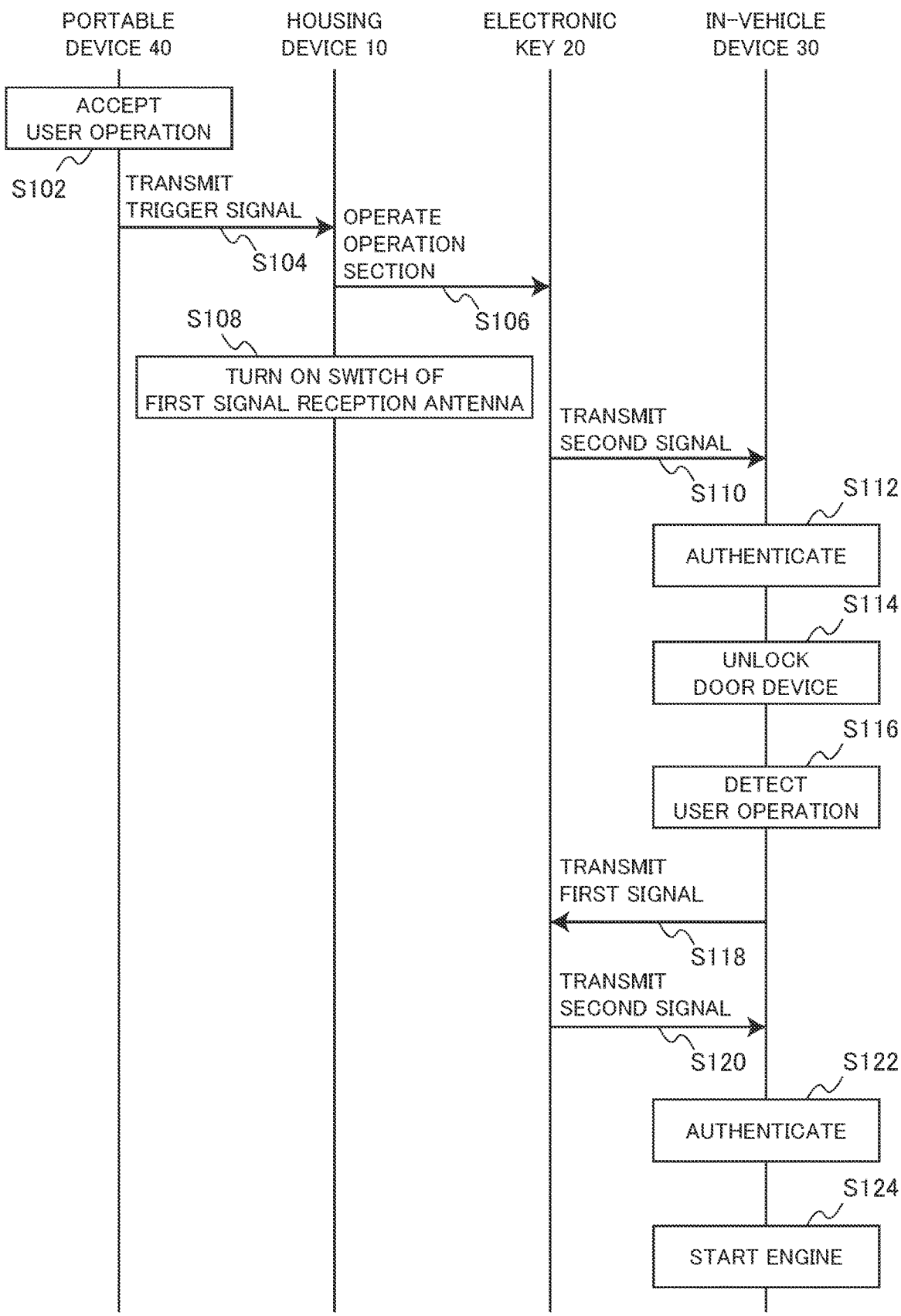
FIG. 5 is a sequence diagram illustrating an example of a flow in a case where the system 1 according to the embodiment performs control to unlock a door device installed in a vehicle V, and start an engine.

In this case, as illustrated in FIG. 5, the portable device 40 carried by the user first accepts a user's operation (S102).

Next, the portable device 40 transmits the trigger signal based on the operation accepted in Step S102 (S104).

Next, the actuator 130 of the housing device 10 moves based on the trigger signal received by the trigger signal reception antenna 120 in Step S104, and operates the operation section 210 installed in the electronic key 20 (S106).

Further, the control mechanism 140 turns on the switch 146 based on the trigger signal received by the trigger signal reception antenna 120 in Step S104 (S108). Consequently, the first signal received outside the housing 110 by the reception antenna 142 is re-emitted to the inside of the housing 110 by the re-emission antenna 144.

Note that the processes in Steps S106 and S108 may be performed in a reverse order of the order illustrated in FIG. 5, or may be simultaneously performed.

Next, the electronic key 20 transmits the second signal based on the fact that the operation section 210 has been operated in Step S106 (S110).

Next, the in-vehicle device 30 that has received the second signal in Step S108 authenticates the electronic key 20 based on information included in the second signal (S112).

In this regard, when verifying the authenticity of the electronic key 20, the in-vehicle device 30 performs control to unlock the door device installed in the identical vehicle V (S114).

Next, the in-vehicle device 30 detects a user operation for starting the engine (S116). The above operation may be, for example, an operation of pushing an engine switch while applying brakes.

Further, the in-vehicle device 30 transmits the first signal based on the user's operation detected in Step S116 (S118).

The first signal transmitted by the in-vehicle device 30 in Step S118 reaches the inside of the housing 110 since the switch 146 is turned on in Step S108.

Next, the electronic key 20 that has received the first signal in Step S118 transmits the second signal as a response to the first signal (S120).

The second signal transmitted by the electronic key 20 in Step S120 passes through the passage structure 115, and reaches the outside of the housing 110.

Next, the in-vehicle device 30 that has received the second signal in Step S120 authenticates the electronic key 20 based on the information included in the second signal (S122).

In this regard, when verifying the authenticity of the electronic key 20, the in-vehicle device 30 may permit the engine installed in the identical vehicle V to start (S124).

Next, a flow in a case where control is performed to stop the engine installed in the vehicle V and lock the door device will be described with reference to FIG. 6.

Figure 6:
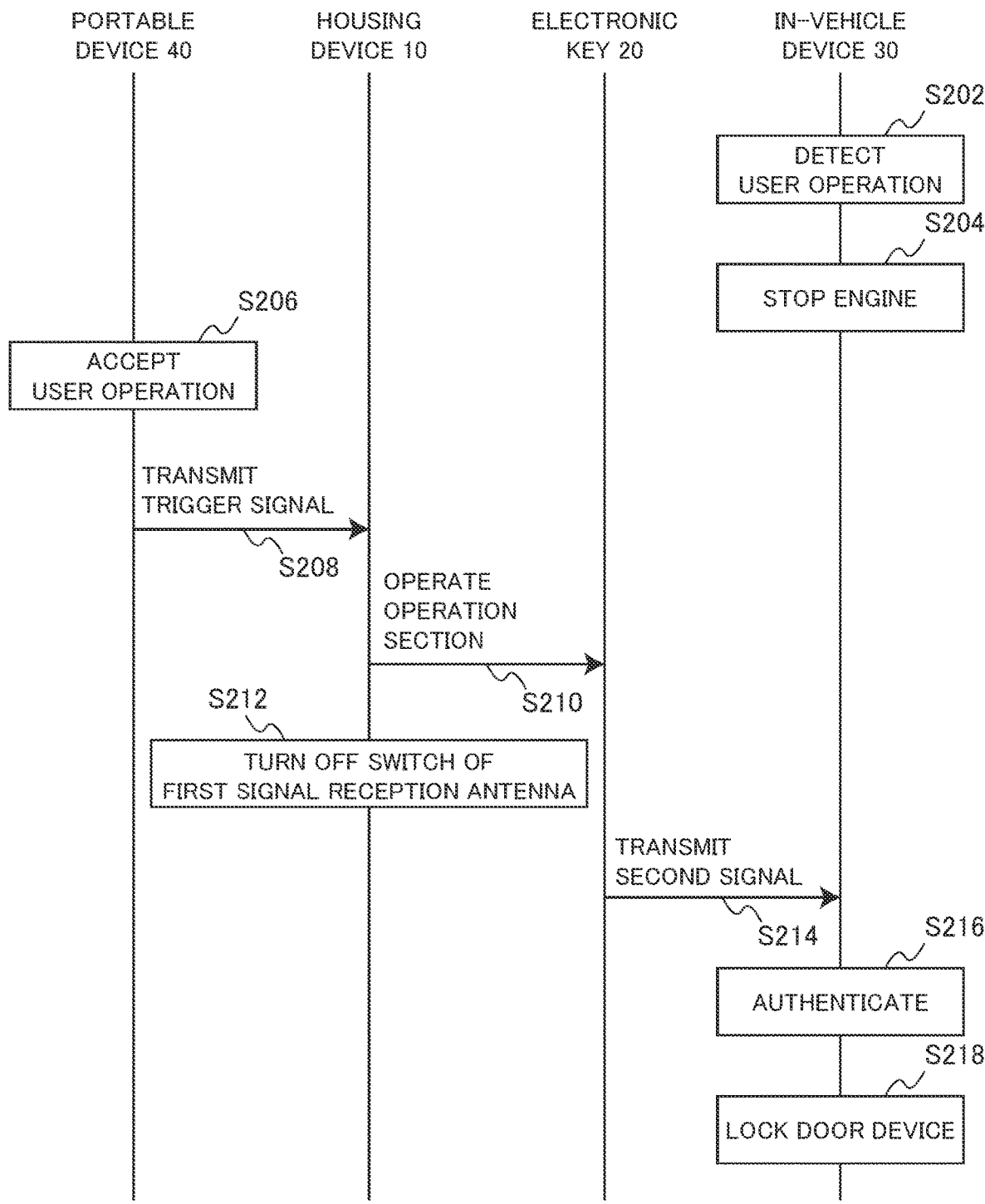
FIG. 6 is a sequence diagram illustrating an example of a flow in a case where the system 1 according to the embodiment performs control to stop the engine installed in the vehicle V, and lock the door device.

In this case, as illustrated in FIG. 6, the in-vehicle device 30 first detects a user operation for stopping the engine (S202). The above operation may be, for example, an operation of pushing the engine switch.

Next, the in-vehicle device 30 performs control to stop the engine based on the user's operation detected in Step S202 (S204).

Next, the portable device 40 accepts an operation that is performed by the user who has gotten off the vehicle V and gives an instruction to lock the door device (S206).

Next, the portable device 40 transmits the trigger signal based on the user's operation accepted in Step S206 (S208).

Next, the actuator 130 of the housing device 10 moves based on the trigger signal received by the trigger signal reception antenna 120 in Step S208, and operates the operation section 210 installed in the electronic key 20 (S210).

Further, the control mechanism 140 turns off the switch 146 based on the trigger signal received by the trigger signal reception antenna 120 in Step S104 (S212). By this means, the first signal is not re-emitted inside the housing 110, and the electronic key 20 is placed in a state where the electronic key 20 cannot receive the first signal.

Note that the processes in Steps S210 and S212 may be performed in a reverse order of the order illustrated in FIG. 6, or may be simultaneously performed.

Next, the electronic key 20 transmits the second signal based on the fact that the operation section 210 has been operated in Step S210 (S214).

Next, the in-vehicle device 30 that has received the second signal in Step S214 authenticates the electronic key 20 based on the information included in the second signal (S216).

In this regard, when verifying the authenticity of the electronic key 20, the in-vehicle device 30 performs control to lock the door device installed in the identical vehicle V (S218).

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims Further, a series of processes of each device described in the specification may be realized by using one of software, hardware, and a combination of the software and the hardware. A program that configures the software is stored in advance in, for example, a recording medium (non-transitory media) that is provided inside or outside each device. Further, each program is, for example, read on an RAM when executed by a computer, and is executed by a processor such as a CPU. The above recording medium is, for example, a magnetic disk, an optical disk, a magneto-optical disk, or a flash memory. Further, the above computer program may be distributed via, for example, a network without using the recording medium.

What is claimed is:

1. A housing device configured to store an electronic key configured to perform wireless communication with an in-vehicle device mounted on a vehicle, the housing device comprising:
   a housing formed by using a material that shields a first signal transmitted by the in-vehicle device;
   a trigger signal reception antenna configured to receive a trigger signal transmitted by a portable device carried by a user,
   wherein an actuator of the housing device moves based on the trigger signal received by the trigger signal reception antenna, and operates an operation section installed in the electronic key to transmit a second signal; and
   a control mechanism configured to control whether or not to enable the first signal to reach an inside of the housing based on the trigger signal,
   wherein the second signal transmitted by the electronic key that has received the first signal is used to control a control target device installed in the vehicle, and
   wherein the housing includes a passage structure configured as a rectangular slit having a size and a shape that (i) do not allow the first signal to pass through the rectangular slit, and that (ii) allow the second signal to pass through the rectangular slit, a longitudinal direction of the rectangular slit being determined based on a first signal wavelength and a second signal wavelength.

2. The housing device according to claim 1, wherein the control mechanism controls whether or not to re-emit the first signal received outside the housing to the inside of the housing based on the trigger signal.

3. The housing device according to claim 2,
   wherein the control mechanism includes a reception antenna disposed outside the housing, a re-emission antenna disposed inside the housing, and a switch configured to switch whether or not to connect the reception antenna and the re-emission antenna, and
   the control mechanism switches the switch based on the trigger signal.

4. The housing device according to claim 1,
   wherein the first signal is a signal of a first frequency band, and
   the second signal is a signal of a second frequency band whose wavelength is shorter than a wavelength of the first signal.

5. The housing device according to claim 1,
   wherein the control target device includes at least an engine installed in the vehicle.

6. The housing device according to claim 1,
   wherein the housing is formed by using a highly magnetic permeable material having a predetermined magnetic permeability or more.

7. A system, comprising:
   an electronic key configured to perform wireless communication with an in-vehicle device mounted on a vehicle;
   a housing device configured to store the electronic key; and
   a portable device carried by a user,
   wherein the housing device includes
   a housing formed by using a material that shields a first signal transmitted by the in-vehicle device,
   a trigger signal reception antenna configured to receive a trigger signal transmitted by the portable device,
   wherein an actuator of the housing device moves based on the trigger signal received by the trigger signal reception antenna, and operates an operation section installed in the electronic key to transmit a second signal; and
   a control mechanism configured to control whether or not to enable the first signal to reach an inside of the housing based on the trigger signal,
   wherein the second signal transmitted by the electronic key that has received the first signal is used to control a control target device installed in the vehicle, and
   wherein the housing includes a passage structure configured as a rectangular slit having a size and a shape that (i) do not allow the first signal to pass through the rectangular slit, and that (ii) allow the second signal to pass through the rectangular slit, a longitudinal direction of the rectangular slit being determined based on a first signal wavelength and a second signal wavelength.

8. The system according to claim 7, further comprising:
the in-vehicle device,
wherein the in-vehicle device controls the control target device based on the received second signal.

9. A system, comprising:
an in-vehicle device mounted on a vehicle;
an electronic key configured to perform wireless communication with the in-vehicle device; and
a housing device configured to store the electronic key,
wherein the housing device includes
   a housing formed by using a material that shields a first signal transmitted by the in-vehicle device,
   a trigger signal reception antenna configured to receive a trigger signal transmitted by a portable device carried by a user,
   wherein an actuator of the housing device moves based on the trigger signal received by the trigger signal reception antenna, and operates an operation section installed in the electronic key to transmit a second signal; and
   a control mechanism configured to control whether or not to enable the first signal to reach an inside of the housing based on the trigger signal,
wherein the second signal transmitted by the electronic key that has received the first signal is used to control a control target device installed in the vehicle, and
wherein the housing includes a passage structure configured as a rectangular slit having a size and a shape that (i) do not allow the first signal to pass through the rectangular slit, and that (ii) allow the second signal to pass through the rectangular slit, a longitudinal direction of the rectangular slit being determined based on a first signal wavelength and a second signal wavelength.

10. The system according to claim 9, further comprising:
the portable device.

* * * * *